(12) United States Patent
Bopardikar (10) Patent No.: US 6,519,772 B1
(45) Date of Patent: Feb. 11, 2003

(54) VIDEO DATA STORAGE

(75) Inventor: Raki C. Bopardikar, Carlisle, MA (US)

(73) Assignee: Autodesk Canada Inc., Montreal (CA)

( * ) Notice: Subject to any disclaimer, the term of this patent is extended or adjusted under 35 U.S.C. 154(b) by 0 days.

(21) Appl. No.: 08/840,297

(22) Filed: Apr. 11, 1997

Related U.S. Application Data

(60) Provisional application No. 60/015,404, filed on Apr. 15, 1996.

(51) Int. Cl.[7] .......................... G06F 11/16; G06F 13/00; G06F 17/30; H04N 7/16
(52) U.S. Cl. .......................... 725/115; 725/145; 725/92; 345/723; 711/114; 711/167
(58) Field of Search .............................. 348/7; 709/217; 345/328, 533–543, 723, 731–732; 356/46, 125; 711/111–114, 167, 168; 725/87–97, 114–117, 145–147

(56) References Cited

U.S. PATENT DOCUMENTS

| | | |
|---|---|---|
| 4,056,843 A | 11/1977 | Bishop et al. |
| 4,500,908 A | 2/1985 | Mandeberg |
| 4,530,048 A | 7/1985 | Proper |
| 4,577,240 A | 3/1986 | Hedberg et al. |
| 4,855,813 A | 8/1989 | Russell et al. |
| 5,027,212 A | 6/1991 | Marlton et al. |
| 5,157,511 A | 10/1992 | Kawai et al. |
| 5,208,813 A | 5/1993 | Stallmo |
| 5,247,347 A | 9/1993 | Litteral et al. |
| 5,265,098 A | 11/1993 | Mattson et al. |
| 5,278,838 A | 1/1994 | Ng et al. |
| 5,309,560 A | 5/1994 | Abe et al. |
| 5,369,532 A | 11/1994 | Dodt et al. |
| 5,442,390 A * | 8/1995 | Hooper et al. ............. 725/90 |
| 5,452,235 A | 9/1995 | Isani |
| 5,455,628 A | 10/1995 | Bishop |

(List continued on next page.)

FOREIGN PATENT DOCUMENTS

| | | |
|---|---|---|
| EP | 0 501 818 | 9/1992 |
| EP | 0 519 670 | 12/1992 |
| EP | 0 605 170 | 7/1994 |
| EP | 0 663 638 | 7/1995 |
| GB | 2273584 | 6/1994 |
| GB | 2278228 | 11/1994 |
| GB | 2297855 | 4/1996 |
| WO | WO 98/10586 | 3/1998 |

OTHER PUBLICATIONS

Willner, "Transforming the PC Into a TV, Radio, VCR, and Video Editing Studio", WESCON '95 Conference Record Microelectronics, Communications Technology, Producing Quality Products, Mobile and Portable Power, Emerging Technologies, San Francisco, No. 7–9, 1995, Nov. 7, 1995, Institute of Electrical and Electronics Engineers, pp. 743–748.

Fronczak et al., "Motion JPEG and MPEG Solutions for Multimedia", Wescon '95 Conference Record Microelectronics, Communications Technology, Producing Quality Products, Mobile and Portable Power, Emerging Technologies, San Francisco, No. 7–9, 1995, Nov. 7, 1995, Institute of Electrical and Electronics Engineers, pp. 738–742.

Primary Examiner—Andrew Faile
Assistant Examiner—Reuben M. Brown
(74) Attorney, Agent, or Firm—Gates & Cooper LLP (57) ABSTRACT

Frames of image data are stored in a device capable of effecting a plurality of data transfers with respective processes. The data is transferable up to a notional maximum transfer-rate bandwidth. Bandwidth is allocated to particular requesting processes within said notional maximum. A frame of image data is then transferred to each of said processes in turn so that each process receives its allocated bandwidth within said notional maximum.

22 Claims, 10 Drawing Sheets

U.S. PATENT DOCUMENTS

| | | | |
|---|---|---|---|
| 5,469,308 A | | 11/1995 | Hamoda et al. |
| 5,488,695 A | | 1/1996 | Cutter |
| 5,493,638 A | * | 2/1996 | Hooper et al. ............... 345/435 |
| 5,499,341 A | | 3/1996 | Wilson et al. |
| 5,510,905 A | | 4/1996 | Birk |
| 5,517,612 A | | 5/1996 | Dwin et al. |
| 5,517,652 A | * | 5/1996 | Miyamoto et al. .......... 725/115 |
| 5,530,557 A | | 6/1996 | Asit et al. |
| 5,530,850 A | | 6/1996 | Ford et al. |
| 5,559,764 A | | 9/1996 | Chen et al. |
| 5,566,251 A | * | 10/1996 | Hanna et al. ................ 382/284 |
| 5,568,180 A | * | 10/1996 | Okamoto ....................... 348/7 |
| 5,583,653 A | | 12/1996 | Timmermans |
| 5,590,381 A | * | 12/1996 | Mourad ........................ 710/52 |
| 5,598,276 A | | 1/1997 | Cookson et al. |
| 5,611,056 A | | 3/1997 | Hotchkin |
| 5,623,595 A | | 4/1997 | Bailey |
| 5,659,539 A | * | 8/1997 | Porter et al. ................ 709/217 |
| 5,671,386 A | | 9/1997 | Blair et al. |
| 5,671,389 A | | 9/1997 | Saliba |
| 5,678,023 A | | 10/1997 | Adams et al. |
| 5,696,905 A | | 12/1997 | Reimer et al. |
| 5,719,983 A | | 2/1998 | Henderson et al. |
| 5,719,985 A | | 2/1998 | Ito et al. |
| 5,720,037 A | * | 2/1998 | Biliiris et al. .................. 348/13 |
| 5,729,279 A | * | 3/1998 | Fuller ............................ 348/8 |
| 5,740,388 A | * | 4/1998 | Hunt ........................... 345/328 |
| 5,751,336 A | * | 5/1998 | Aggarwal et al. ............. 348/7 |
| 5,754,730 A | | 5/1998 | Windrem et al. |
| 5,758,057 A | | 5/1998 | Baba et al. |
| 5,758,151 A | * | 5/1998 | Milligan et al. ............. 707/100 |
| 5,765,186 A | * | 6/1998 | Searby ........................ 711/100 |
| 5,768,623 A | | 6/1998 | Judd et al. |
| 5,771,354 A | | 6/1998 | Crawford |
| 5,818,439 A | | 10/1998 | Nagasaka et al. |
| 5,825,967 A | * | 10/1998 | Stewart et al. ................. 386/52 |
| 5,852,715 A | | 12/1998 | Raz et al. |
| 5,862,312 A | * | 1/1999 | Mann et al. .................... 714/6 |
| 5,884,028 A | | 3/1999 | Kindell et al. |
| 5,884,098 A | | 3/1999 | Mason, Jr. |
| 5,890,203 A | * | 3/1999 | Aoki ............................. 348/7 |
| 5,893,919 A | | 4/1999 | Sarkozy et al. |
| 5,968,158 A | | 10/1999 | Andrews et al. |
| 6,055,354 A | | 4/2000 | Bopardikar |
| 6,144,391 A | * | 11/2000 | Hinson et al. ............... 345/507 |

* cited by examiner

VIDEO DATA STORAGE

This application claims priority under 35 U.S.C. Section 119(e) based on provisional Application No. 60/015,404, filed on Apr. 15, 1996.

The present invention relates to storing frames of video data on a plurality of co-operating storage devices.

INTRODUCTION

Video data storage devices are known in which broadcast quality video signals are transferred to and from storage at their display rate, also known as video rate or real time rate.

Data storage environments have become known in computer related fields which are capable of conveying signals having a greater bandwidth than that required for a real time video signal. For example, a raise of disks may be built, allowing each video frame to be divided into a plurality of stripes. Each stripe is then written to its own respective disk. Furthermore, redundant parity information may also be included, possibly on its own respective disk. In these environments, the bandwidth may be increased by increasing the size of the array, therefore it becomes possible to provide data transfers capable of conveying two video clips, three video clips or possibly more in real time.

Conventional controllers for transferring data in redundant arrays operate on a first-first come basis, such that a first requesting process will be allocated all of the available bandwidth. Thus, in a system capable of conveying data at three times video rate, this could result in a single data transfer being effected at three times the display rate while other processes are prevented from effecting a transfer. It has therefore been found that conventional arrangements for data arrays, used in environments where financial data is stored for example, are not suitable for the storage of video data. In this respect, it should be understood that video data may take the form of broadcast data at normal definition, where each frame consists of an interlaced field, non interlaced RGB frames, high definition video and digitised cinematographic film etc.

SUMMARY OF THE INVENTION

According to a first aspect of the present invention there is provided video data storage apparatus, comprising storage means, transfer means and processing means, wherein said transfer means is arranged to transfer video clips between said storage means and a plurality of processes, said storage means comprises a plurality of storage devices, and said processing means is configured to allocate individual frames to said processes so as to allow each process to transfer frames at a rate at least equal to video display rate.

In a preferred embodiment, the transfer means is arranged to transfer each frame at a rate substantially higher than said display rate, with extended periods occurring between the transfer of each frame to facilitate the transfer of frames belonging to other clips.

Preferably, the processing means is configured to guarantee bandwidth up to a notional maximum value. The transfer means may facilitate the provision of transfer bandwidth in excess of the notional value, wherein said processing means is configured to allow transfers beyond said notional value while not guaranteeing said transfers beyond said notional value.

According to a second aspect of the present invention, there is provided a method of storing video data, in which video clips are transferred between storage means and a plurality of processes and said storage means comprise a plurality of storage devices, wherein individual frames are allocated to processes so as to allow each process to transfer frames at a rate at least equal to video display rate.

DETAILED DESCRIPTION OF A PREFERRED EMBODIMENT

Figure 1:
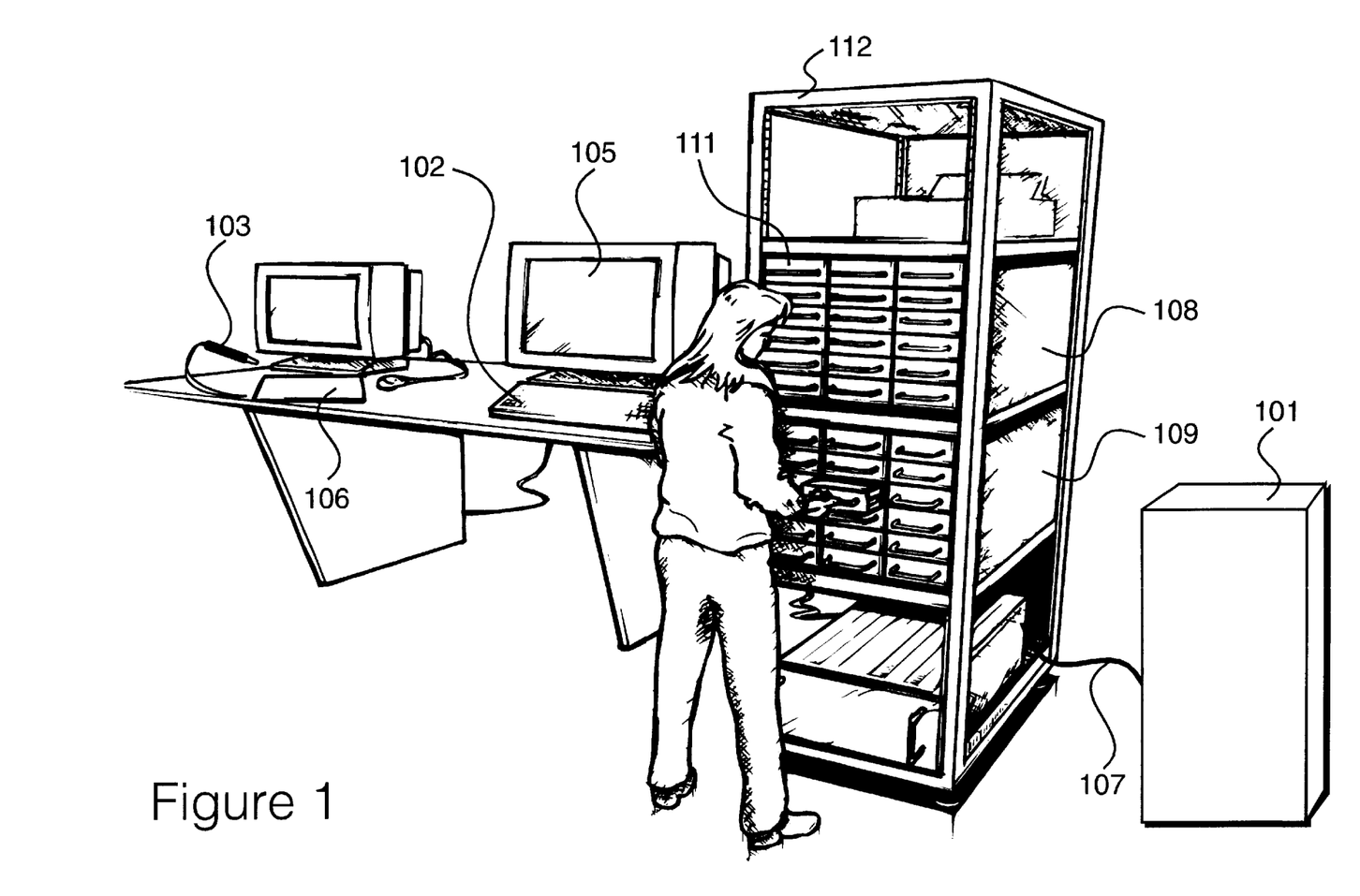
FIG. 1 shows a data processing environment, including a processing device.

An image data processing environment is shown in FIG. 1, in which an image processing device 101 receives input commands from manually operable devices, including a keyboard 102 and a stylus 103. In the preferred embodiment, the image processing device 101 is an SGI Onyx, manufactured by Silicon Graphics Incorporated. A video image is displayed on a monitor 105 and modifications, special effects and edits are defined in response to manual operation of the stylus 103 upon a touch tablet 106. The environment may be similar to those marketed by the present Assignee under the trademarks "INFERNO", "FLAME" and "FLINT".

The image processing device 101 includes internal storage, allowing a plurality of image frames to be retained locally for subsequent manipulation and editing. In addition, the image processing device includes a connection 107 arranged to supply image frames at video rate (or higher), thereby substantially increasing the extent to which video manipulations may be effected within the environment, without requiring local data transfers.

Connection 107 consists of a plurality of Fast Wide Differential SCSI cables connected to two physical arrays of disk drives 108 and 109; individual disk modules 111 are housed within a rack 112. It is accepted that, over time, problems will occur with specific disk drive modules 111, either in terms of part of the disk becoming damaged or the entire disk module 111 becoming totally inoperable, a condition often referred to as a "head crash". The disks are therefore configured as a redundant array of inexpensive disks (RAID) such that parity data is generated when data is written to the array, allowing any individual disk to be replaced if a head crash occurs without any data actually being lost.

As shown in FIG. 1, a damaged disk is removed from the array for replacement with a similar unit. Procedures are then invoked to read parity data, in combination with all of the remaining image data, so as to reconstitute the lost data and to re-establish the data in the array as being protected against similar future drive malfunction.

Figure 2:
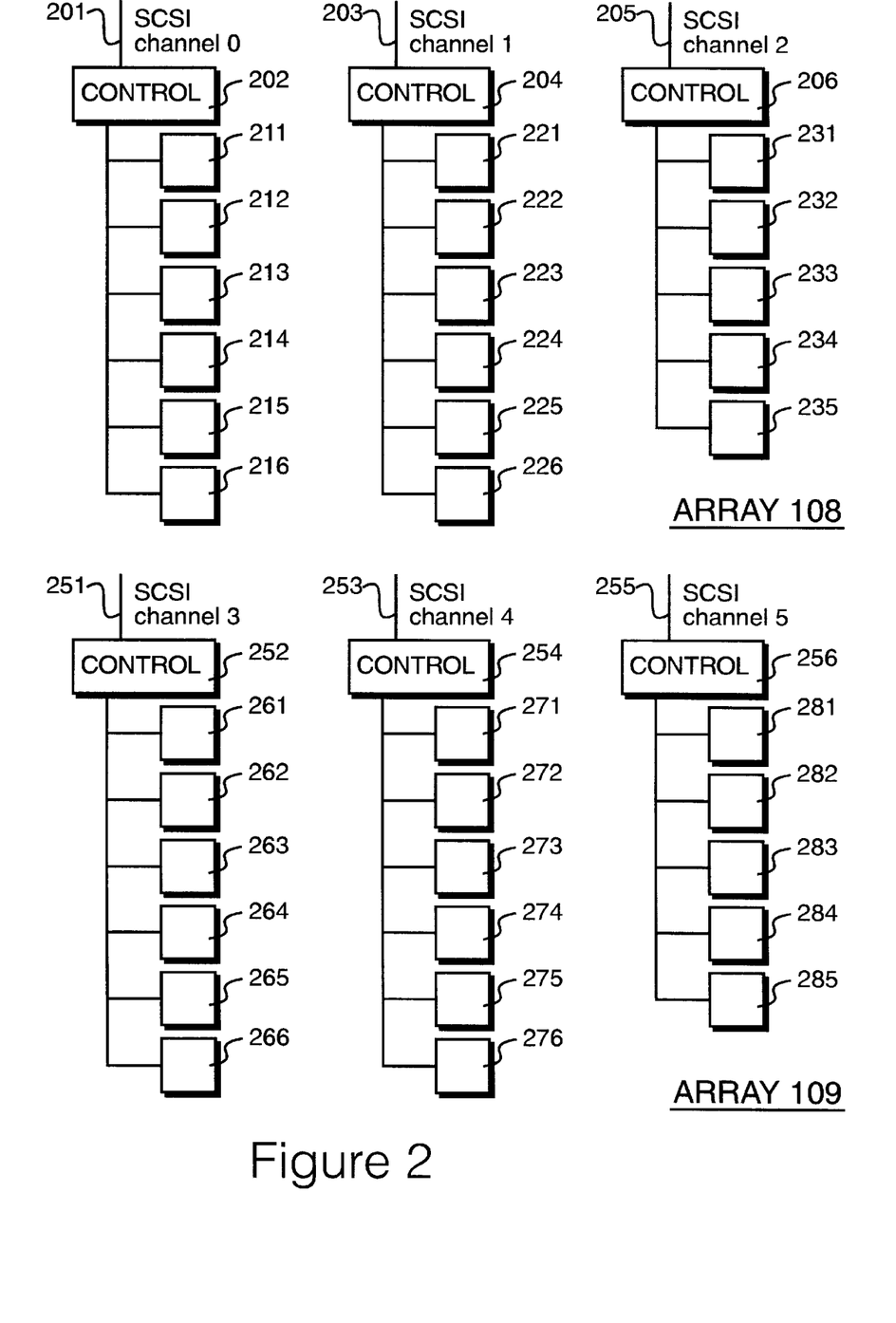
FIG. 2 shows a configuration of a disk array, of the type used in the environment shown in FIG. 1.

Configuration of the disk drive arrays 108 and 109 shown in FIG. 1 is detailed in FIG. 2. Array 108 is connected to three SCSI channels. SCSI channel 0, 201, is connected to control circuitry 202. SCSI channel 1, 203, is connected to control circuitry 204. SCSI channel 2, 205, is connected to control circuitry 206. Control circuitry 202 supplies and receives SCSI control and data signals to and from an array of six high capacity hard disk drives, 211, 212, 213, 214, 215 and 216, each having a capacity of two gigabytes of data. The control circuitry 202 and each of the six drives connected to control circuitry 202 are considered as being a SCSI target. The control circuitry is considered as being target zero, drive 211 is target one, drive 212 is target two, drive 213 is target three, drive 214 is target four, drive 215 is target five and drive 216 is target six.

Similarly, SCSI channel 2, 203, communicates with control circuitry 204 and drives 221, 222, 223, 224, 225 and 226, considering these as targets zero to six respectively. SCSI channel 2, 205, similarly communicates with control circuitry 206 and drives 231, 232, 233, 234 and 235.

The array 108 may be considered as comprising a main disk array in which there are three columns and five rows, making a total of fifteen disks. The remaining two disk drives, 216 and 226, are used for parity information and as a spare disk respectively. The parity information may be used to reconstruct data which is lost from a drive in the array, and the spare disk 226 may be used to replace a drive which has suffered a major fault, such as a head crash.

Also shown in FIG. 2 is array 109. This comprises a substantially similar arrangement to that which is shown for array 108, with the exception that connections are made via different SCSI connections. These are SCSI channel 3, 251, SCSI channel 4, 253 and SCSI channel 5, 255. Thus control circuitry 252 is considered as target zero on SCSI channel three, controlling drives 261, 262, 263, 264, 265 and 266, which are considered as being SCSI targets one to six respectively. Control circuitry 254 is considered as being target zero on SCSI channel 4, and drives 271, 272, 273, 274, 275 and 276 are considered as being SCSI targets one to six respectively. Control circuitry 256 is considered as target zero on SCSI channel five, with drives 281, 282, 283, 284 and 285 as SCSI targets one to five. Drive 266 is used to store parity information, and drive 276 is spare.

Figure 3:
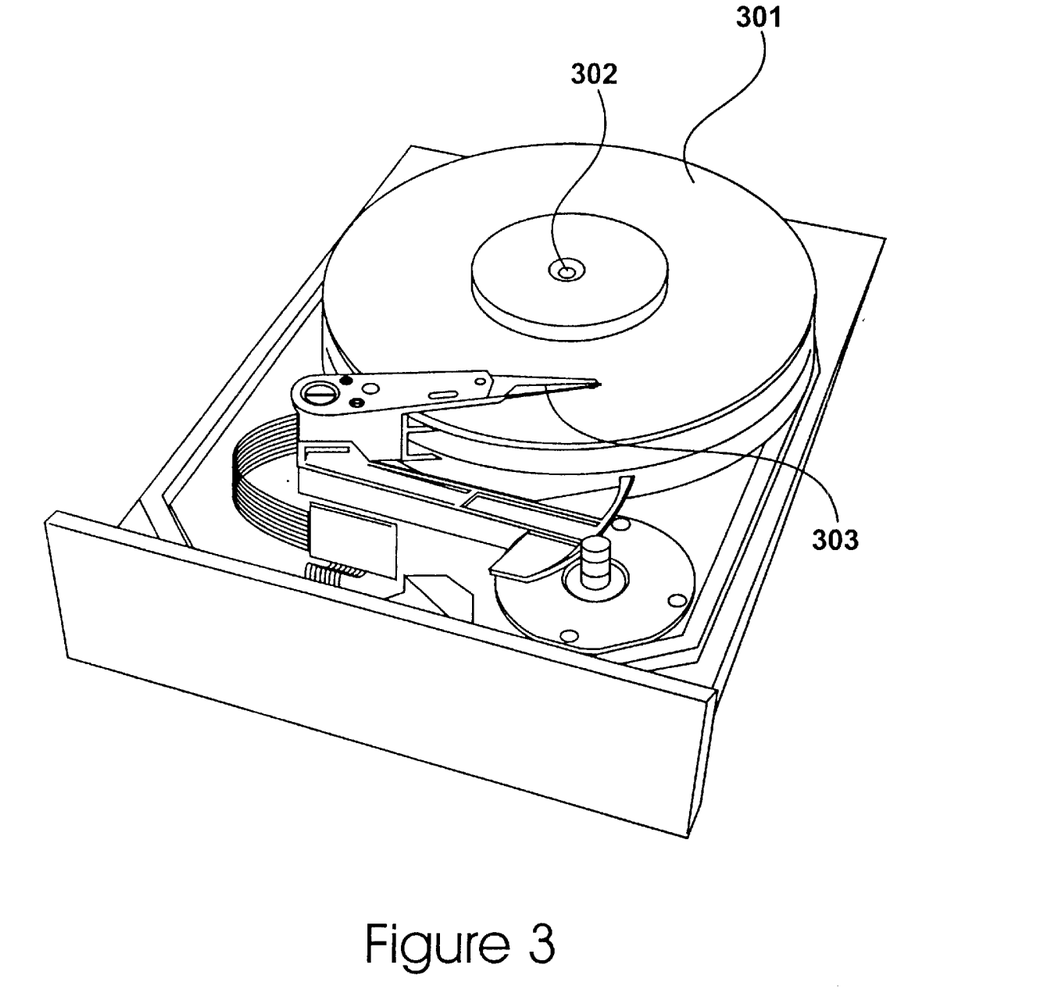
FIG. 3 illustrates an individual disk drive unit.

A disk drive unit 111 of the type shown in FIG. 1, and indicated in FIG. 2 is illustrated in FIG. 3, having outer casing and seals etc. removed. The disk comprises a rotatable magnetic medium 301 arranged to rotate about a drive shaft 302. The disk is accessed by means of a head 303, arranged to be supported by a cushion of air generated by the rotating velocity of the disk 301 below it. Information on the disk 301 is formatted as a plurality of tracks and sectors and a data access is made by moving the head 303 radially across the disk to the particular circumference at which data is to be written to or read from the disk. The time taken for data to be written to the disk or read from the disk may be considered as being made up of three components. Firstly, it is necessary for the head 303 to traverse radially across the disk in order to locate itself at the appropriate sector for data transfer. Secondly, data transfer can only take place when the disk has positioned itself such that the start of the appropriate sector is directly below the transfer head. Finally, the actual data transfer takes place involving a magnetic interaction between the recording medium 301 and the head itself. If large data transfers occur, using relatively large regions of disk, the time taken for such a transfer to occur will be predominantly dependent on the third component, with the first and second components being relatively small.

However, as the area of interaction on the disk becomes smaller, the duration required in terms of the first and second components becomes relatively large, such that the perceived transfer rate will be influenced not so much by the actual rate at which data may be transferred to or from the disk, but in terms of the time taken for the head to traverse across the disk and for the appropriate start of the data to reach the position of the head over the disk.

In known systems it is necessary to define the striping of discs at a stage of system configuration. System configuration is a major undertaking, and cannot be performed on a daily basis. Indeed, the complexity of system configuration is such that it is to be avoided except when it is absolutely essential, such as when a new graphics processor has been purchased and it is necessary to define the striping of disks for all anticipated uses of the disc array.

Figure 4:
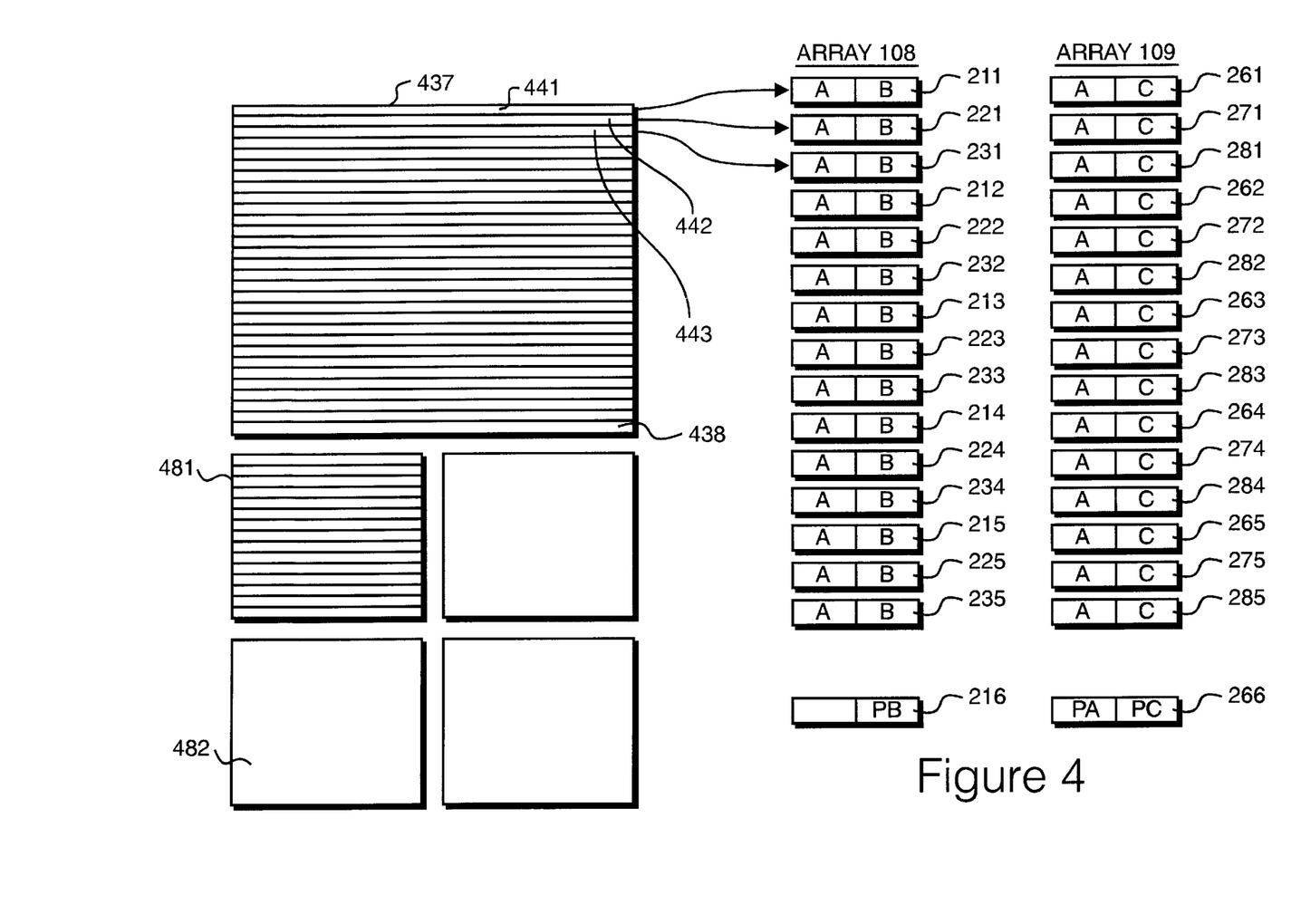
FIG. 4 illustrates the striping of image frames across a plurality of disks.

Furthermore, in known systems, the striping of disks for use with particular data formats, such as broadcast quality video frames of NTSC and HDTV, requires that the disks are logically partitioned. Striping, and its relationship with disk partitions, is shown in FIG. 4.

A frame of high definition television (HDTV) data 437 is split into stripes, 441, 442 and 443. Each stripe is supplied to a separate disk drive 211, 221 and 231. The same stripes from preceding and successive frames are sent to these same drives. Thus, although each drive has data capacity for a number of frames, stripes are stored across several drives in order to facilitate the high speed of data transfer that is required for the video transfer of signals at video rate. In the example shown in FIG. 4, HDTV signals are stored on areas of disks designated with the letter A. Thus an area A of each disk has been assigned to the storage of HDTV frames 437.

In a typical video editing studio, more than one type of video signal may be used, depending on the job in hand. Thus, it makes sense to designate an area of each disk for another type of storage, for example NTSC video frames. An NTSC video frame 481, split into stripes, is also shown in FIG. 4. In disk drive array 108, half of each disk has been assigned for storage of HDTV frames, A, and the other half has been designated for storage of NTSC frames B. This allocation is known as a partition, and is fixed at the time of system installation. Thus drive 211 is partitioned into two areas, A and B, for the exclusive use of HDTV and NTSC frame data, respectively.

HDTV frames require considerably more bandwidth for display in real time than NTSC or PAL frames. Thus, although an NTSC frame may be read at sufficient speed from an array 108 of fifteen striped disks 211 to 235 plus parity 216, HDTV frames must be striped over thirty disks: 211 to 235 and 261 to 285 plus parity 266, in order to attain the necessary high bandwidth. Thus two drive arrays 108 and 109 are required. The drives in the second array 109 are striped for use by a third data type, C, for example PAL television signals 482, or some other type of high bandwidth data.

Partitioning of the arrays into areas A, B and C is performed when the system is initially configured, and does not take into account the day-to-day variation in data types which will be experienced when the system is in use. Thus, on days when no HDTV editing is to be done, half of the available disk space is unavailable. Given the cost of such an array, existing solutions provide an inefficient method of allocating disk space.

The drives in the array are permanently partitioned into a single logical area, as opposed to the several areas A, B and C of known systems. The maximum bandwidth required from the array is taken into consideration, and a fixed number of stripes is defined. For example, if the system has to cope with HDTV signals, it will be necessary to define the number of stripes as being set to thirty. Alternatively, if only NTSC, PAL and lower bandwidth signals, such as JPEG2, are to be encountered, the number of stripes may be preset to fifteen.

Figure 5:
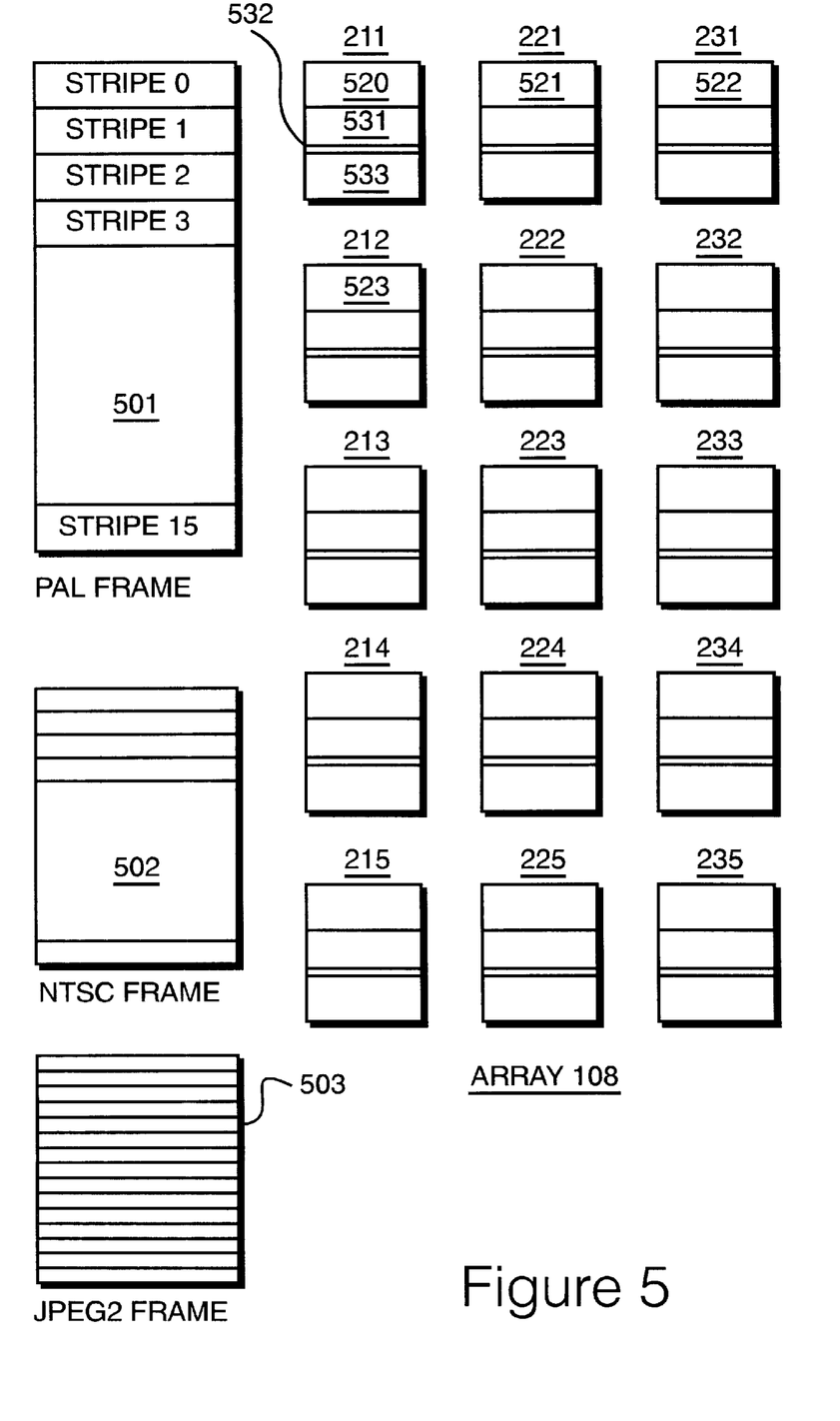
FIG. 5 illustrates the striping of different sized frames across a plurality of disks.

Each frame of video data is divided up into the same number of stripes by the graphics processor 101, regardless of the amount of data in a frame. Thus the size of each stripe, or the striping interval, depends on the amount of data required for a particular frame. An example of a system using a fixed number of fifteen stripes is shown in FIG. 5. An incoming PAL frame 501 is split into fifteen equally sized stripes. Each stripe is supplied to a different drive in the array 108. Thus, stripe 0 from frame 501 is supplied to disk drive 211 and is stored in area 520. Stripe 1 from frame 501 is supplied to area 521 on disk drive 221. Stripe 2 from frame 501 is supplied to area 522 on disk drive 231, stripe 3 from frame 501 is supplied to area 523 on disk drive 212, and so on. Stripes are written substantially simultaneously to all fifteen drives in order to achieve the required high video bandwidth.

Frame 502, shown in FIG. 5, is from an NTSC image data source, requiring slightly less storage than the PAL frame 501. This is also stored as fifteen equal length stripes in the drive array 108. But in this case, each stripe 531 will be slightly shorter than each stripe 520 for the PAL signal. A JPEG2 source frame 503 requires less storage than either the PAL frame 501 or the NTSC frame 502. This also is split into fifteen equal length stripes 532 for storage on the fifteen drives in the array 108.

Thus, as each incoming frame is supplied to the array 108, a different length of stripe is selected in accordance with the amount of data in each frame. Certain video frame data will include preceding data which indicates the amount of data to follow which will make up a single frame. In this case, it is possible for the graphics processor 101 to divide up image data as it is transferred to the drive array 108 into stripes of the required size, such that fifteen stripes will be used to store the frame. Alternatively, some video sources will not have their frame data size defined before the data is received. In this case it is necessary to buffer the data for the individual frame, measure the size of the data once the frame is completely received, and then allocate a stripe size accordingly. The frame is then transferred from the buffer to the drive array as fifteen correctly sized stripes. Preferably, procedures for manipulating video images include means or procedures for measuring and identifying a frame size before a frame is supplied to a drive array, such that the striping interval may be adjusted without the need to buffer frame data.

Figure 6:
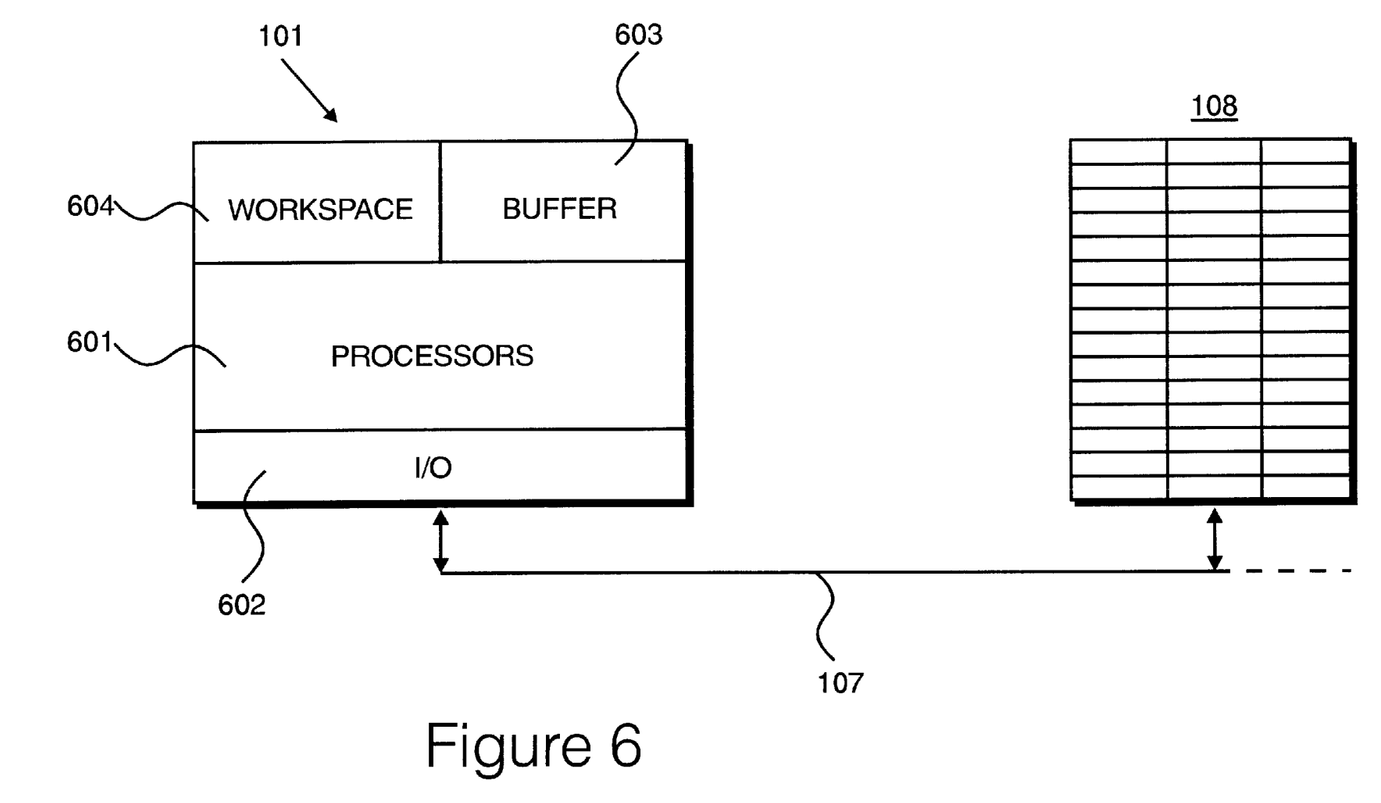
FIG. 6 details a buffering arrangement for video frames.

Details of buffering arrangements for frames of unspecified video frame data sizes are shown in FIG. 6. The graphics processor 101 includes processors 601 and input and output interface circuitry 602 connected to drive arrays such as array 108 via SCSI connections 107. Also included in the graphics processor is an area of memory 603 for buffering image data in order to measure its size before a stripe size is defined. Other memory areas in the graphics processor 101 are used for workspace 604, which is required for intermediate calculations during typical image editing operations.

Typical disk operations are performed in data blocks of 512 data bytes. Thus, each stripe comprises an integer number of these data blocks, even though some degree of wastage may occur.

As shown in FIG. 5, each of the fifteen main drives in the array 108 includes the same subdivision into stripes, but the stripe size is variable. Thus a mechanism is provided by which it is possible to use whatever data space is available in the drive array for whichever format is currently being edited, while maintaining the high bandwidth required for real time image transfer. The subdivisions of the drives shown in FIG. 5 are for diagrammatic purposes only, and many frames of each type of signal may be stored on the array. Thus, in addition to the stripes shown, the pattern of striping would be repeated several times, depending on the number of frames of each type which are stored. Thus, one may consider area 533 on drive 211 to be stripe 0 of the second PAL frame, whereas area 520 is stripe zero of the first PAL frame, and so on.

The example shown in FIG. 5 shows the case for a system set up to provide fifteen stripes. In the case of HDTV editing, this will not provide sufficient bandwidth. Thus, in an alternative arrangement, a combined array of thirty disks plus parity and spare disks, or more, is used, with all frames divided up into thirty stripes or more; the size of the stripes being variable in response to the received image frame data size when writing to the combined array, but the number of stripes being fixed.

Furthermore, video frame data may be considered as a specific instance of high bandwidth data. Thus, the apparatus may be arranged to consider video frames as block of data, and other types of data block may be advantageously stored.

A problem exists with the solution described so far, in that variable striping intervals have correspondingly variable degrees of speed efficiency with respect to the access times of the hard disks in the array. Thus, while it is necessary to stripe over thirty drives in order to attain the desired bandwidth for an HDTV signal, striping over thirty disks for a much lower bandwidth signal results in a small amount of data being supplied to each disk in the stripe. When small amounts of data are written to each disk, the head access times, which are in the order of several milliseconds, will predominate over the time taken to transfer the small amount of data, thereby reducing the theoretical efficiency of this system.

The level of efficiency becomes particularly important if the same drive array or arrays is being used by several operators to manipulate images of different bandwidths. This puts the drives in the array under considerable pressure, in that the number of random head movements that are necessary will be increased dramatically. Thus, it is possible for the workload of the system to be restricted unnecessarily by the large number of stripes which are used for small bandwidth image data. Furthermore, disk drive failure is related to the frequency of disk head movements, and it would therefore be advantageous to reduce striping inefficiency for this reason.

In the preferred embodiment, the system is initially configured in accordance with the minimum bandwidth which it is necessary to process. Typically, the smallest bandwidth signal is that used for compressed image proxy frames. These are used to represent higher definition signals, such as NTSC, PAL, or possibly film, at a lower bandwidth, such that images may be displayed on a lower cost graphics workstation, such as a Silicon Graphics Indigo.

For example, a sequence from an NTSC image file may be converted into proxy form, for display on a monitor. Video editing personnel may then construct a series of edit decisions, based on what is viewed on the monitor at a low resolution. This may involve re-ordering various parts of the video sequence and so on. Based on these edit decisions, the results may be previewed, again at reduced resolution. Finally, once the edit decisions have been finalised, they may be applied to the full bandwidth signal, which is not viewable on the monitor. A typical compressed image proxy has half the vertical resolution and half the horizontal resolution of its respective high definition original. This results in a bandwidth reduction of a factor of four.

Compressed image proxies from NTSC or PAL originated data may be efficiently striped across four high capacity hard disks. It is this number which is then used as the basis for configuration of the disk array. The combination of the four disks is considered as a sub group. Each sub group of disks includes an additional dedicated parity disk, thus, in this example, each sub group requires five disks. Higher bandwidth signals are striped across integer multiples of sub groups. The combination of sub groups used for striping an individual frame is called a group. The array of drives includes an integer number of sub groups, plus one or a number of spare drives.

As frames are processed by the graphics processor 101 for subsequent storage in an array of drives 108 and 109, the frame is allocated an integer number of sub groups over which it will be striped. Thus, a level of striping efficiency is maintained across multiple data bandwidths, without the need to pre-define a particular area or set of disks for use with a particular type of image or block of data.

Under the operation of the system described so far, it becomes possible to operate a large disk array for use with a variety of data bandwidths while retaining reasonable efficiency. A typical use for such a system is in an editing studio where more than one editing terminal is in use. For example, a first operator may require access to the disk array while performing digital editing of NTSC video frames. In the course of likely editing events, it is sometimes the case that two frames are required simultaneously. An example of this requirement is when a smooth crossfade is made from one image source to another. Throughout the duration of the crossfade, two NTSC data streams are required.

In the meantime, a second operator may be in the process of editing a High Definition Television sequence of frames. While the system described so far theoretically provides sufficient bandwidth for all this to occur simultaneously, in practice, due to implementation details, some frames may be delayed, resulting in a temporarily frozen display during a full motion sequence.

Figure 7:
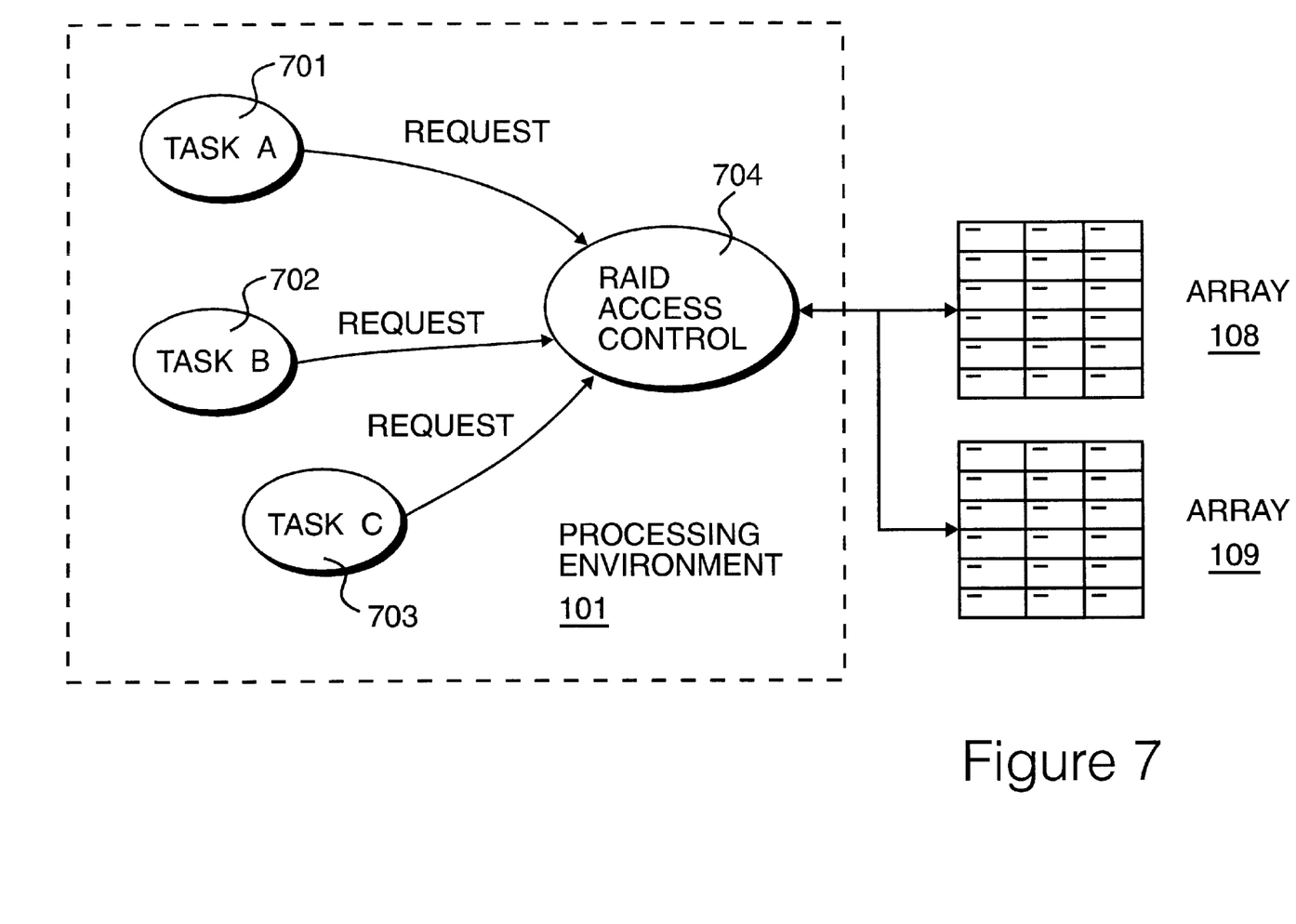
FIG. 7 illustrates problems associated with transferring multiple video clips.

The problem is illustrated in FIG. 7. Three data processing processes or tasks 701, 702 and 703 are shown which operate in the processing environment of the graphics processor 101. Each of the tasks makes a request for access to the disk array 108 and 109. This request is made via a RAID access control process 704, which is part of the operating system of the graphics processor 101. The RAID access control process 704 supervises access and data transfer between the RAID array, 108 and 109, and the graphics processor 101.

Figure 8A:
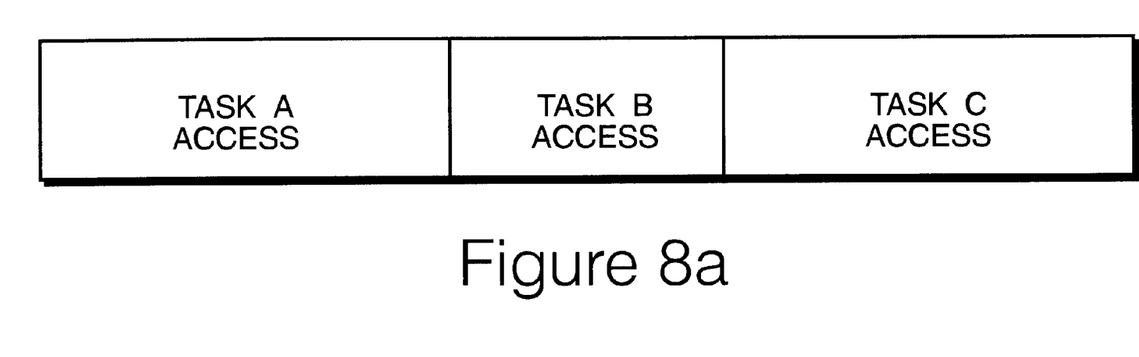
FIG. 8a and FIG. 8b illustrate frame transfer operations.

The result of this arrangement is shown in FIG. 8A. The first task which requests access to the disk array is given control for the time requested by the task. In the example shown, task A 701 is the first task to make such a request. A request made by task B 702, shortly after the request made by task A 701, is delayed until the transfer requested by task A 701 is complete. A request made by task C 703 shortly after the request made by task B 702 is delayed even longer, as it has to wait until task B has completed its requested transfer.

Although the transfers requested by each of the three tasks may only be for a single frame, their unpredictability may cause a frame to be delayed by a fraction of a frame interval, or possibly more, if enough such requests are allowed to build up.

Figure 8B:
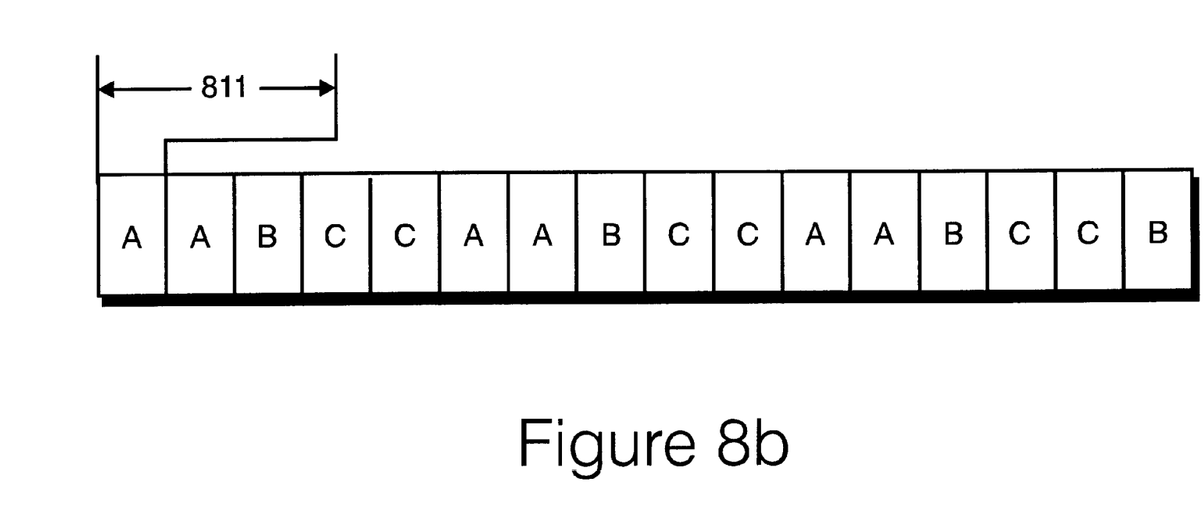

The instantaneous data transfer rate between a task and the disk array is much higher than the average bandwidth of the data that is required, and this fact makes a solution possible. FIG. 8B identifies an improved timing arrangement in response to the requests made by tasks A, B and C shown in FIG. 7. In FIG. 8B data transfer begins soon after any request is made, but is left incomplete because other requests are pending. The delay between a request being made and the first data transfer occurring is affected by the time 811. The time 811 is chosen so as to optimise the relationship between transfer delays and the processing overhead required at the border between each transfer.

Figure 9:
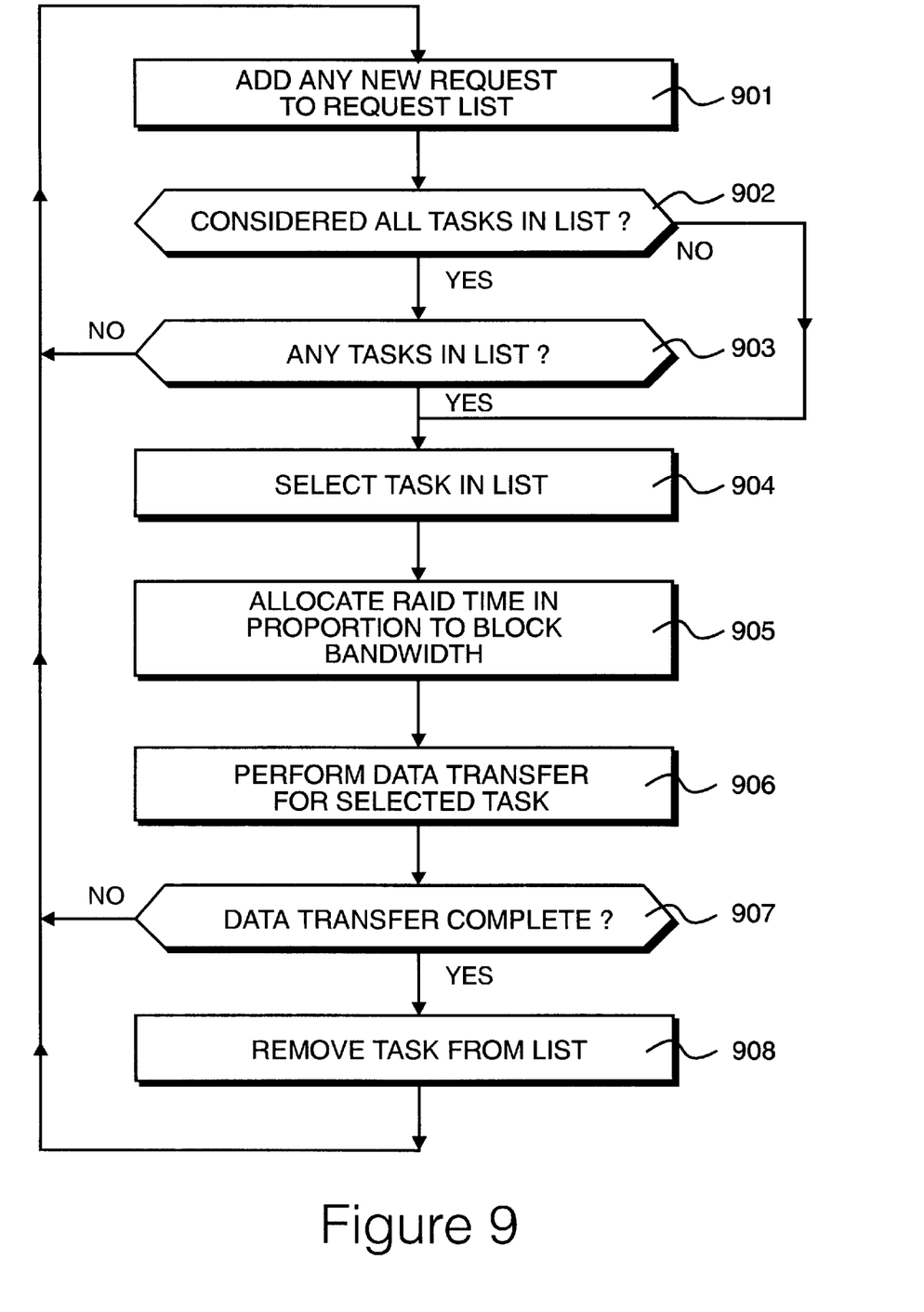
FIG. 9 details processors for effecting improved timing arrangements.

Processes in the RAID access control process 704 for effecting the improved timing arrangement shown in FIG. 8B are detailed in FIG. 9. The processes shown in FIG. 9 may be considered as a continuous loop running in the processing environment of the graphics processor 101. In process 901 any new requests made by tasks running in the processing environment 101 are added to the request list. In practice, there is a limit to the number of requests which may be held in the list at the same time, which is dictated by the total bandwidth required for the transfers which have been requested. Typically, however, this limit is not exceeded, as the limitations of the system will be known by the operators in advance of its use.

In process 902, a question is asked as to whether all tasks in the list have been considered. If the result of this is yes, control is directed to process 903, where a question is asked as to whether there are any tasks in the list. If the result of this question is no, control is directed to process 901, and processes 901, 902 and 903 are repeated until a task actually makes a request.

If the result of process 902 is no, or the result of process 903 is yes, control is directed to process 904, where the next task in the list is selected for consideration. If there is only one task left in the list, this task will have its transfer performed continuously. In process 905, access to the RAID array is allocated in proportion to the bandwidth of the data being transferred. If this proportional allocation is not performed, higher bandwidth data would be delayed proportionally longer than low bandwidth data.

In process 906 the data transfer for the selected task is performed over the allocated time. In process 907 a question is asked as to whether the data transfer is complete. If not, control is directed to process 901, and other tasks in the list will be considered before the remaining data is transferred. Alternatively, if the requested data transfer for currently selected task has been completed as a result of process 906, the task is removed from the list in process 908. Thereafter control is directed to process 901, so that the remaining tasks in the list will continue to be allocated transfer times, until those transfers are completed. Under heavy use, more tasks will be added to the task request list before the list has completely emptied, so as old transfer requests are removed, new ones are added, at a roughly equal rate.

Figure 10:
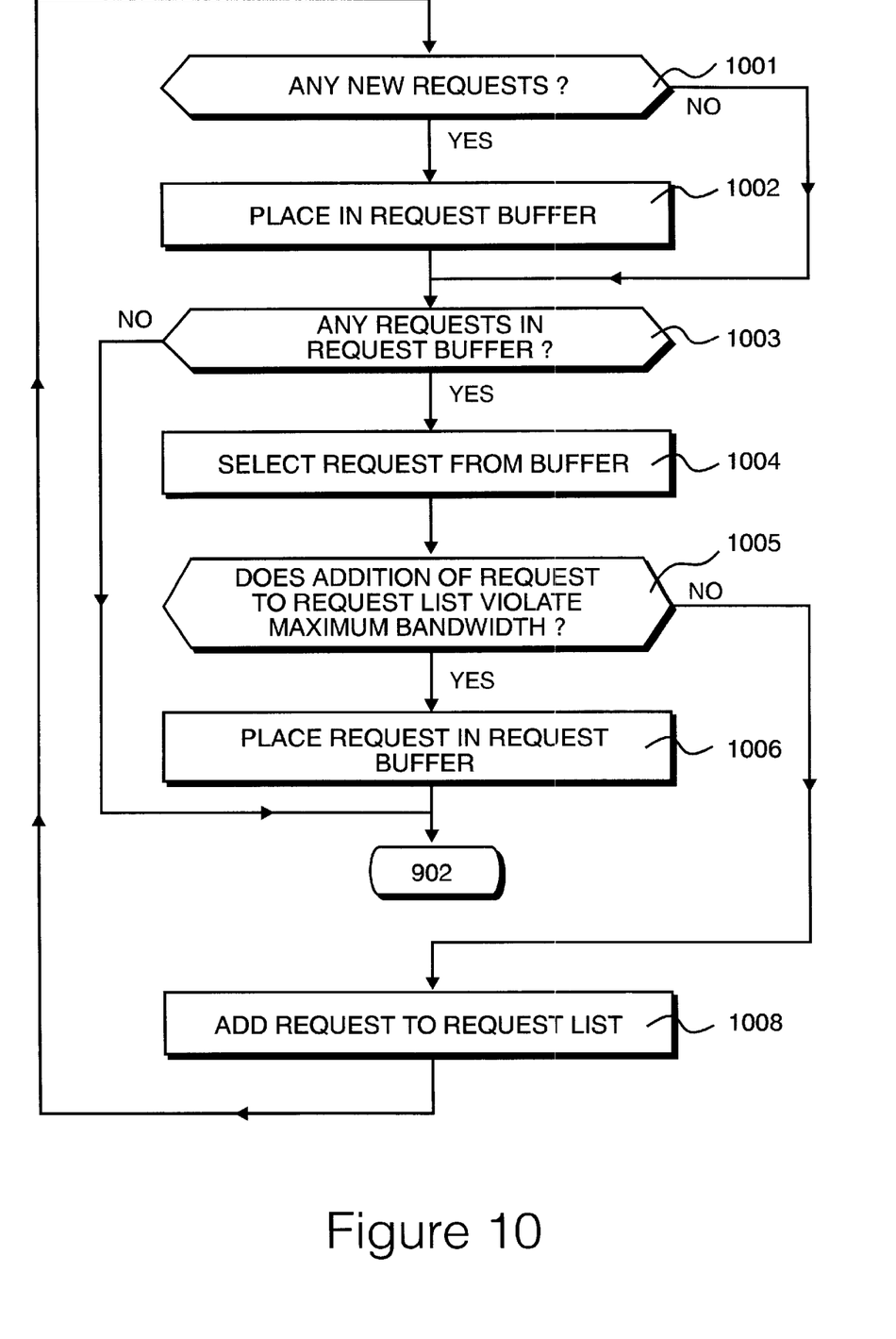
FIG. 10 illustrates a process for adding new requests to a request list.

The process 901 shown in FIG. 9 for adding new requests to the request list is detailed in FIG. 10. In process 1001 a question is asked as to whether a task has made a new request for data transfer. If the result of this is no, control is directed to process 1003. Alternatively, control is directed to process 1002, where the request is placed in a first in first out request buffer. Thereafter control is directed to process 1003. In process 1003 a question is asked as to whether there are any requests in the request buffer. If the result of this question is no, control is directed to process 902 shown in FIG. 9. Alternatively, control is directed to process 1004, where a process is selected from the request buffer, and at the same time removed from the request buffer.

In process 1005, a question is asked as to whether the addition of the currently considered request to the request list, operating in FIG. 9, would violate the maximum bandwidth of the system. If the result of this is yes, control is directed to process 1006, where the request is returned to the request buffer, for reconsideration at a later time. Thereafter control is directed back to process 902 in FIG. 9. Alternatively, if bandwidth is available, the request is added to the request list in process 1008. Thereafter, processes 1001 onwards are repeated until either all outstanding requests have been added to the request list, or there is not enough bandwidth to add another request.

What I claim is:

1. A video editing system comprising storage means, transfer means and processing means, wherein
    said storage means comprises a plurality of storage devices,
    said processing means is configured to receive an input frame from a first image clip, receive an input frame from a second image clip and produce an output frame of an output clip such that output frames of said output clip are generated at a rate at least equal to video display rate, and
    said transfer means is arranged to provide a transfer bandwidth between said storage means and said processing means and is configured to allocate the bandwidth on a frame by frame basis between said first image clip, said second image clip and said output clip, thereby ensuring that the bandwidth is shared between the three clips being transferred.

2. Apparatus according to claim 1, wherein said transfer means is arranged to transfer each frame at a rate substantially higher than said display rate.

3. Apparatus according to claim 1, wherein said processing means is configured to guarantee transfer bandwidth up to a notional maximum value.

4. Apparatus according to claim 3, wherein said transfer means facilitates the provision of transfer bandwidth in excess of said notional value, wherein said processing means is configured to allow transfers beyond said notional value while not guaranteeing said transfers beyond said notional value.

5. Apparatus according to claim 1, wherein said storage means are magnetic disks.

6. Apparatus according to claim 1, wherein said video data is generated from cinematographic film.

7. Apparatus according to claim 1, wherein said video data is generated from high definition video data.

8. Apparatus according to claim 1, wherein said video data is generated from broadcast quality video data and said frames consist of interlaced fields and transfers occur on a field by field basis.

9. Apparatus according to claim 1, wherein said video data is generated from compressed video data.

10. A method of processing stored video data in a video editing system in which video clips are transferred between storage means and a processing means and said storage means comprises a plurality of storage devices, the method comprising:
    said processing means receiving an input frame from a first image clip, receiving an input frame from a second image clip and producing an output frame of an output clip such that output frames of said output clip are generated at a rate at least equal to video display rate; and
    said transfer means providing a transfer bandwidth between said storage means and said processing means and allocating the bandwidth on a frame by frame basis between said first image clip, sad second image clip and said output clip, thereby ensuring that the bandwidth is shared between the three clips being transferred.

11. A method according to claim 10, wherein each frame is transferred at a rate substantially higher than said display rate.

12. A method according to claim 10, wherein transfer bandwidth is guaranteed up to a notional maximum value.

13. A method according to claim 12, wherein the provision of transfer bandwidth in excess of said notional value is facilitated to allow transfers beyond said notional value while not guaranteeing said transfers beyond said notional value.

14. A method according to claim 10, wherein said storage devices are magnetic disks.

15. A method according to claim 10, wherein said video data is generated from cinematographic film.

16. A method according to claim 10, wherein said video data is generated from high definition video frames.

17. A method according to claim 10, wherein said video data is generated from broadcast quality video fields.

18. A method according to claim 10, wherein said video data is generated from compressed video data.

19. A video data editing system, comprising:
    one or more storage devices for storing video data;
    video data editing terminals that generate requests for clips of the stored video data, wherein the requests include simultaneously pending requests for first and second clips of the stored video data; and
    transferring means for transferring the first and second clips on a frame-by-frame basis in response to the requests, said transferring means being configured to
      (a) transfer a portion of the first clip,
      (b) then transfer a portion of the second clip,
      (c) then transfer the next portion of the first clip,
      (d) then transfer the next portion of the second clip, and
      (e) repeat (c) and (d) until all portions of the first clip or all portions of the second clip are transferred,
    wherein said one or more storage devices comprises a redundant array of inexpensive disks.

20. The system according to claim 19, wherein the first and second video clips have different video formats.

21. A method of processing stored video data in a video editing system, the method comprising:
    (a) receiving requests for clips of the stored video data, the requests including simultaneously pending requests for first and second clips of the stored video data; and
    (b) allocating bandwidth to transfer the first and second clips on a frame-by-frame basis such that
      (i) a portion of the first clip is transferred and then a portion of the second clip is transferred;
      (ii) the next portion of the first clip is transferred and then the next portion of the second clip is transferred; and
      (iii) repeating step (ii) until all portions of the first clip or all portions of the second clip are transferred,
    wherein the video data is stored in a redundant array of inexpensive disks.

22. The system according to claim 21, wherein the first and second video clips have different video formats.

* * * * *

UNITED STATES PATENT AND TRADEMARK OFFICE
CERTIFICATE OF CORRECTION

PATENT NO. : 6,519,772 B1  Page 1 of 1
DATED : February 11, 2003
INVENTOR(S) : Raju C. Bopardikar It is certified that error appears in the above-identified patent and that said Letters Patent is hereby corrected as shown below:

<u>Title page,</u>
Item [75], Inventor, "Raki" should read -- Raju --
Item [56], U.S. PATENT DOCUMENTS, "Biliiris" should read -- Biliris --

<u>Column 10,</u>
Line 8, "sad" should read -- said --

Signed and Sealed this

First Day of July, 2003

JAMES E. ROGAN
*Director of the United States Patent and Trademark Office*